United States Patent [19]

Thomas

[11] Patent Number: 4,708,449

[45] Date of Patent: Nov. 24, 1987

[54] MASK SYSTEM FOR MAKING MULTIPLE PHOTOGRAPHIC EXPOSURES

[76] Inventor: William C. Thomas, 262 Lakeview Dr., Apt. B, Slidell, La. 70458

[21] Appl. No.: 872,856

[22] Filed: Jun. 11, 1986

[51] Int. Cl.⁴ ............................................. G03B 11/00
[52] U.S. Cl. ..................................... 354/122; 354/295
[58] Field of Search ................ 354/122, 125, 295, 296

[56] References Cited

U.S. PATENT DOCUMENTS

| | | | |
|---|---|---|---|
| 967,569 | 8/1910 | Schaubert | 354/125 |
| 982,707 | 1/1911 | Drake | 354/125 |
| 1,011,870 | 12/1911 | Smith | 354/125 |
| 1,451,956 | 4/1923 | Payne | 354/125 |
| 3,918,078 | 11/1975 | Savage | 354/296 |
| 3,940,775 | 2/1976 | Bodnar | 354/122 |
| 4,012,748 | 3/1977 | Lemanski | 354/122 |
| 4,079,394 | 3/1978 | Roncone | 354/295 |
| 4,107,716 | 8/1978 | Pfefer | 354/296 |
| 4,124,859 | 11/1978 | Huber | 354/122 |
| 4,137,540 | 1/1979 | Curtis | 354/296 |
| 4,423,939 | 1/1984 | Hayles | 354/122 |
| 4,478,501 | 10/1984 | Klancnik | 354/125 |

*Primary Examiner*—A. A. Mathews
*Attorney, Agent, or Firm*—Pravel, Gambrell, Hewitt, Kimball & Krieger

[57] ABSTRACT

A masking apparatus for forming multiple exposure photographic images includes a plurality of at least first and second planar cards of corresponding size and shape which can be registered in a precise, preselected position with respect to each other upon a camera. A generally circular aperture is formed in the first of the cards and an aperture is formed in the second of the cards which includes a partially circular periphery and a partially concave periphery. Registering is provided for sequentially mounting each card upon a camera in a position that places the apertures in different positions with respect to the film so that multiple exposure photographic images made with the camera occupy different spacial positions.

9 Claims, 10 Drawing Figures

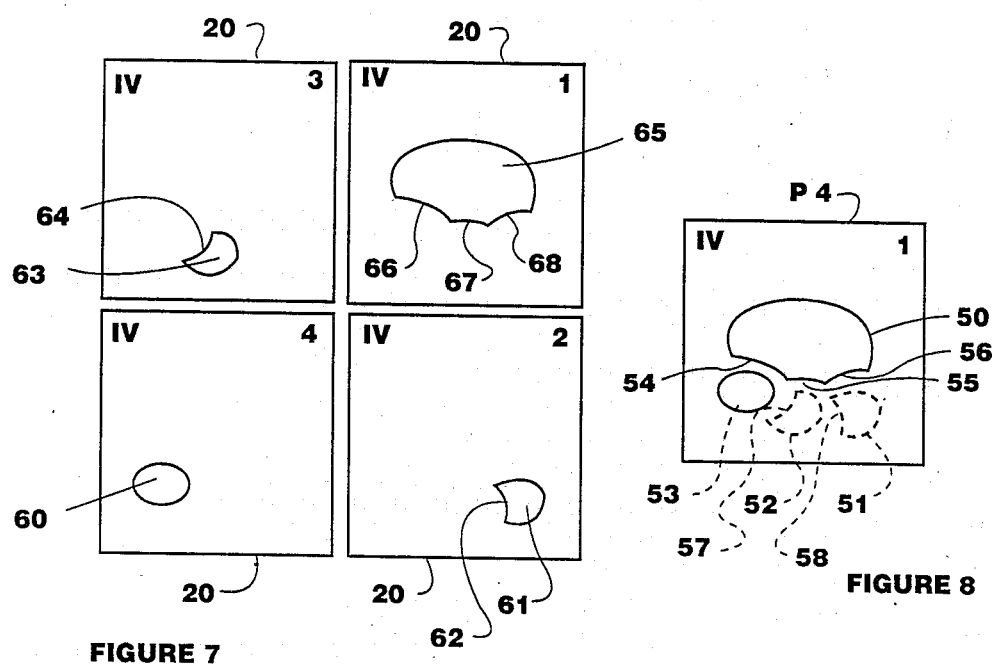
FIGURE 7
FIGURE 8
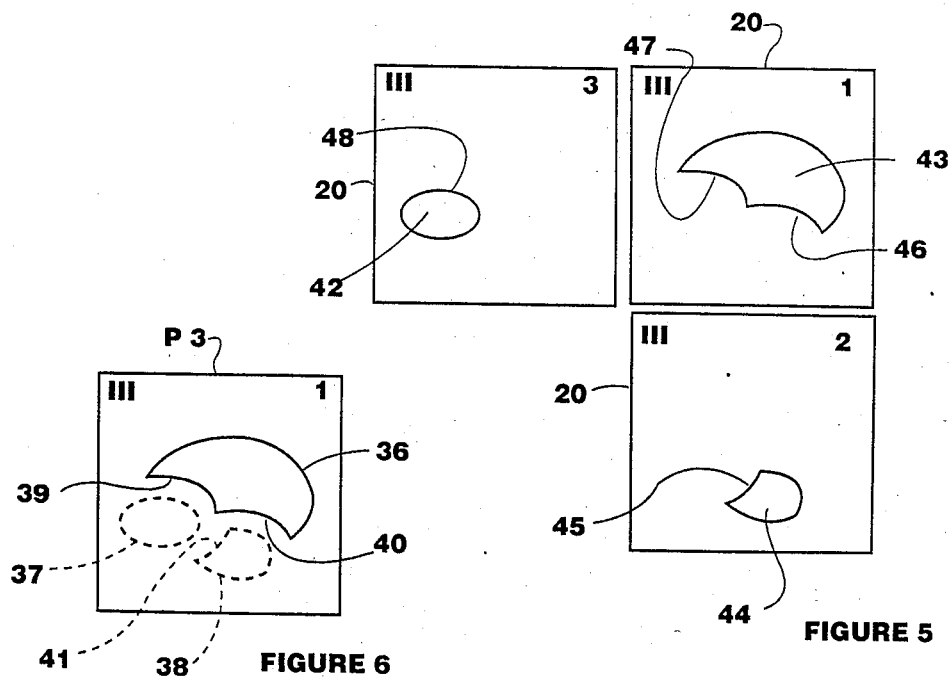
FIGURE 6
FIGURE 5

(1)

MASK SYSTEM FOR MAKING MULTIPLE PHOTOGRAPHIC EXPOSURES

BACKGROUND OF THE INVENTION

The present invention relates to multiple exposure photographic images and an improved apparatus for forming multiple exposures which allows as many as four or five photographic images to be placed upon the same photograph in different spacial positions upon the photograph and wherein some of the images have concave peripheries which can accommodate closely spaced oval shaped or generally circular images positioned adjacent thereto.

The forming of multiple exposures is well known. A camera is exposed multiple times and at each exposure a new image is placed on the film. If the camera lens is simply opened and closed several times in sequence, the images will be superimposed and will not be distinct with respect to each other. However, a masking apparatus can be used which will blacken the majority of the film and prevent light from getting to it while exposing only a preselected portion of the film.

Many multiple exposure devices have been commercially available and some have been patented. Notice, for example, the Drake U.S. Pat. No. 982,707 entitled "Multiple Exposure Attachment For Cameras" patented Jan. 24, 1911. That apparatus uses a multiplying attachment for cameras comprising a frame of open construction adapted to be introduced into a camera adjacent to and directly in front of the plate holder, the frame being provided with a grooved division bar and opaque webs of elastic material adapted to be sprung into and out of the frame into engagement with the same and with the division bar, one of the webs being provided with passages and the other web being inperforate, and sheets of opaque material of less extent than the web with passages therethrough, the sheets being adapted to be introduced into the frame and moved along with the web with passages therethrough to cover chosen ones of the passages at will. The device as shown uses strictly oval apertures.

A "Set Of Dark Slides For Use With A Zone Exposure System" is seen in the Klancnik U.S. Pat. No. 4,478,501 issued Oct. 23, 1984. The apparatus includes a set of dark slides for a film holder of a camera to adapt the camera to be used with a zone system exposure procedure in which all of the exposures are made on a single piece of film. Each dark slide of the set of slides has a single opening. Each opening is formed at a different location on the dark slide so that the openings of all of the dark slides of a set of slides form a pattern of exposures on a piece of film when the film is exposed separately with each dark slide of the holder.

Multiple exposures are the subject of U.S. Pat. No. 4,012,748 issued to Lemanski entitled "Camera Device For Obtaining A Split Image." In that patent, a plurality of generally rectangular images are provided upon a single photograph.

The Bodnar patent entitled "Multiple Exposure Optical Recording Method And Apparatus" provides a method of composing pictures of objects which comprises the steps of exposing a frame of record medium such as a frame of a roll of film or a target in a television camera via a camera lens while masking a portion of the field from exposure by a first mask disposed in front of the lens. The field frame of the record medium is then reexposed via the same lens, while masking a previously unmasked portion of the field or frame and maintaining the F/stop for the lens the same as the first exposure.

An attachment for use on a camera to make it possible to make photomontages by taking separate pictures on different areas of the same film, embodying a mat box comprising a box to be secured to the camera lens having hinged blinds to selectively mask portions of film in the camera so that the unmasked portion of the film will remain unexposed until, by operation of the blinds, the formerly masked portions are selected, and further pictures may be taken without reference to the first picture which is masked.

A camera lens mask arrangement for quick, detachable engagement with a lens mounted on a camera is seen in the Roncone U.S. Pat. No. 4,079,394. A mat box for mounting on a camera and serving as a lens shade and as a support for filters, special effects, masks and the like is seen in the Curtis U.S. Pat. No. 4,137,540 entitled "Camera Mat Box."

Other multiple imaging devices are seen in the Hayles U.S. Pat. No. 4,423,939, the Smith U.S. Pat. No. 1,011,870, the Schaubert U.S. Pat. No. 967,569, the Himes U.S. Pat. No. 728,104 and the Payne U.S. Pat. No. 1,451,956.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 5 is a plan view of a three slide system made in accordance with the present invention;

FIG. 6 is a schematic illustration of a photograph made with the slides of FIG. 5;

FIG. 7 is a plan view of a four slide system in accordance with the present invention;

FIG. 8 is a schematic illustration of a photograph made using the slides of FIG. 7;

DETAILED DESCRIPTION OF A PREFERRED EMBODIMENT

Figure 1:
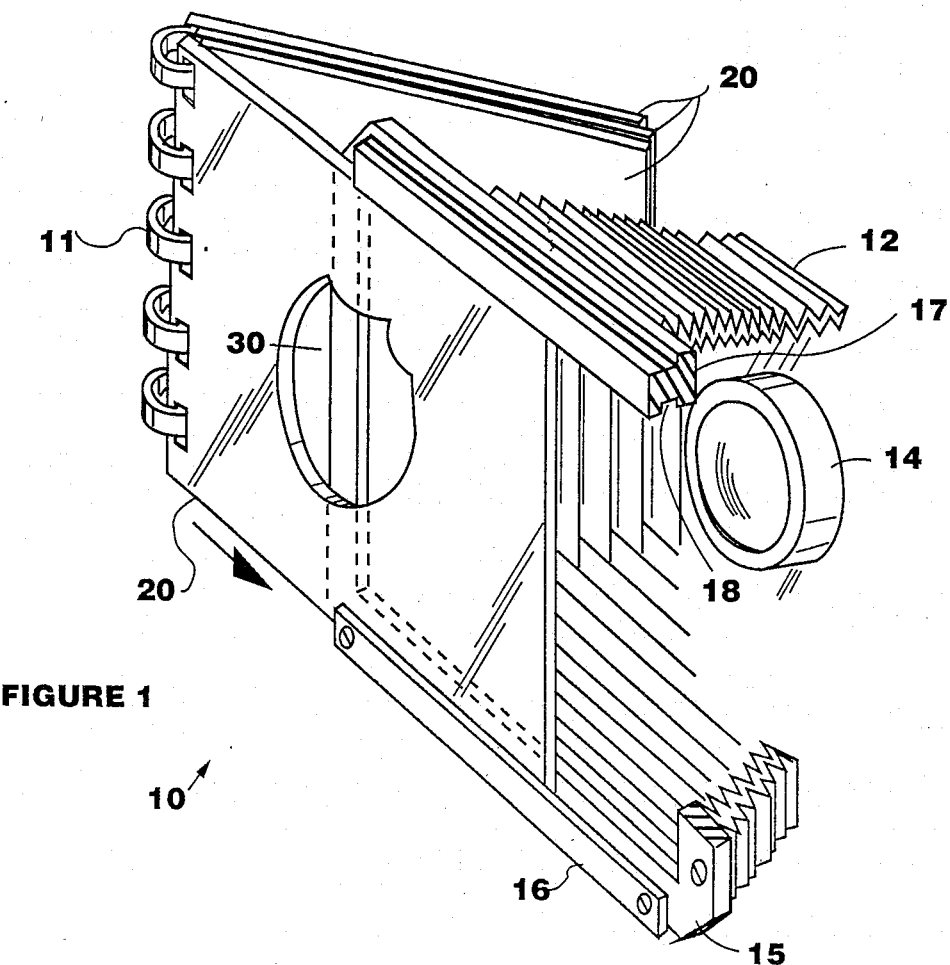
FIG. 1 is a perspective view of the preferred embodiment of the apparatus of the present invention.

In view 1, the numeral 10 generally illustrates the apparatus 10 of the present invention including a plurality of darkened slides 20 each having an aperture 30 which is specially shaped as will be described more fully hereinafter. Each individual darkened slide 20 occupies a position upon camera body 12 which is generally between the image being photographed and the camera lens 14. A plurality of darkened slides 20 (also known as masks) are used with each set, preferably two, three, four or five slides being a complete set. Each set of slides 20 is preferably bound as shown in FIG. 1 with binding material 11. The camera body 12 includes a frame 15 having a peripheral border 16, 17 that defines a recessed channel 18 that functions as a trap for the slide 20. In this manner, the slide can be removably attached to the front of the camera body 12 and in front of lens 14 so that when a picture is taken, the available light must pass through aperture 30 only. The remainder of slide 20 blocks out any existing light. The use of masks per se is known, however, within the teaching of the present invention, and as will be described more fully hereinafter, applicant uses cooperating slides having apertures 30 of special shaped which allow multiple images to be positioned in a unique fashion upon photographs as described with respects to the photographs shown in FIGS. 2, 4, 6, 8 and 10.

Figure 2:
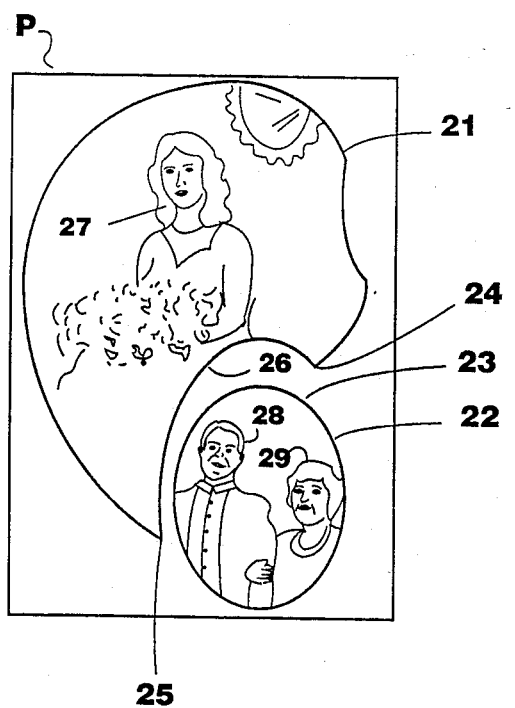
FIG. 2 is a plan view illustrating a photograph made in accordance with the method of the present invention.

In FIG. 2, there can be seen a photograph P having a first image 21 and a second image 22 spaced therefrom. The image 21 includes photographic material 27 which in FIG. 2 is in the form of a bride. The image 21 has a concave section 26 between edges 24, 25. This convex portion provides a recess into which another separate image 22 can be closely positioned, because the second image provides an outer oval or circular periphery 23 that corresponds with the concave edge 26 of the recess. The second image 22 would typically contain other photographic images 28, 29 such as, for example, the parents of the bride groom. The resultant photograph is very functional and pleasing to the eye because it allows one picture to substantially fill the photograph while allowing one or more other subsidiary photographs to be tucked around the periphery of the larger photograph. For example in FIG. 2, the image 21 containing the bride 27 dominates the photograph P, yet the concave section 26 accommodates the smaller image 22 which is oval shaped.

Figure 9:
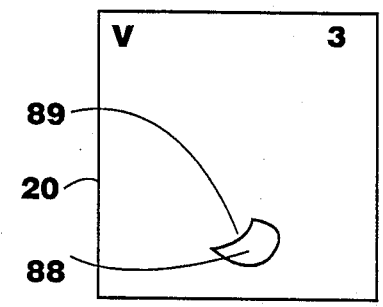
FIG. 9 is a plan view of a five slide system used in accordance with the method of the present invention.
Figure 9:
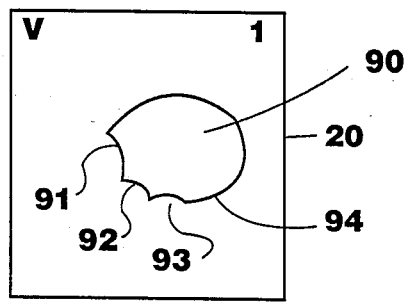
Figure 9:
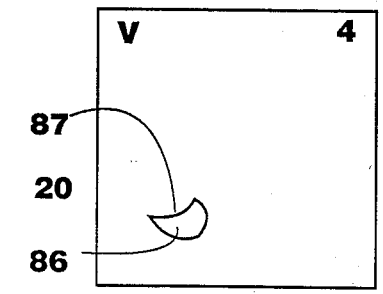
Figure 9:
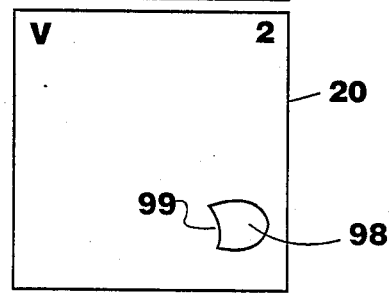
Figure 9:
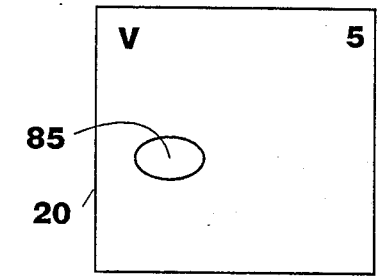
Figure 3:
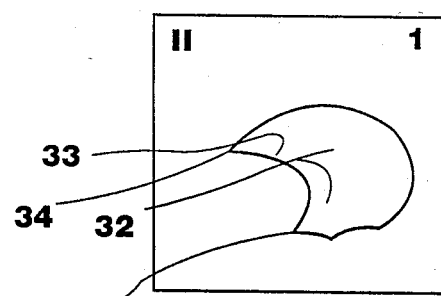
FIG. 3 is a plan view of one embodiment of the present invention illustrating a two slide system.

This placement using a larger image can be seen also in FIG. 3 (with respect to two darkened slides 20), and in FIG. 5 (with respect to three darkened slides 20), in FIG. 7 (with respect to four darkened slides 20), and in FIG. 9 (with respect to five darkened slides 20).

Figure 4:
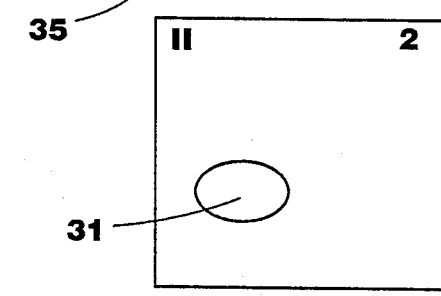
FIG. 4 is a plan view illustrating schematically a photograph made with mast systems of FIG. 3.
Figure 4:
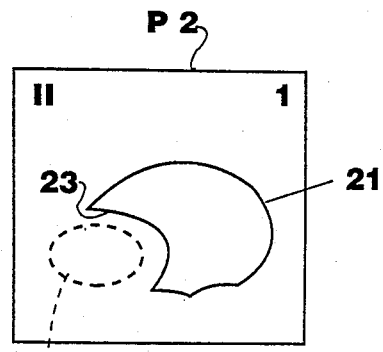

In FIG. 4, there can be seen photograph P2 having a larger image 21 and a smaller oval shaped image 22 with the recessed concave section 23 of the image 21 being concave.

FIG. 6 illustrates an overall photograph P3 having three separate spaced apart images 36, 37, 38. Notice that the image 36 includes two adjacent concave sections 39, 40 which accommodate corresponding spaced images 37, 38. The image 38 also has a concave section 41 of its periphery which registers with the outer surface of image 37. This allows the photographs to be very closely spaced, maximizing the space used on the photograph.

In FIG. 3, two separate slides 20 are shown, with one slide having an aperture 31 which is oval or circular in shape. The second aperture 32 includes a concave section 33 between points 34 and 35.

Similarly, the three slides 20 shown in FIG. 5 include a first slide 20 having an aperture 42 and an outer oval or circular periphery 48, and a second slide 20 having an aperture 44 with a concave section 45, while a third and the largest aperture 43 includes two concave sections 46, 47.

Similarly, the four slide embodiment of FIG. 7 and the five slide embodiment of FIG. 9 follow this aperture pattern using concave peripheral sections. In FIG. 8, a photograph P4 is shown having a large image 50 and three smaller images 51, 52, 53. The larger image 50 includes concave recesses 54, 55, 56, while the smaller images 51, 52, 53 closely abut these surfaces 54, 55, 56 as shown in FIG. 8. Two of the smaller images 51, 52 have concave peripheral sections 57, 58.

This photograph P4 is produced using four darkened slides 20 as shown in FIG. 7 including a slide 21 and aperture 65 having three concave peripheral edges 66, 67, and 68 while the remaining slides 20 contain respectively apertures 60, aperture 61, and aperture 63. The aperture 61 includes a concave section 62 while the aperture 63 contains a concave section 64. Thus, the slide 20 having aperture 65 produces image 50 on photograph P4. The slide with aperture 60 produces the image 53 on photograph P4, and the slide with aperture 61 produces image 51 while the slide with aperture 63 produces image 52.

Figure 10:
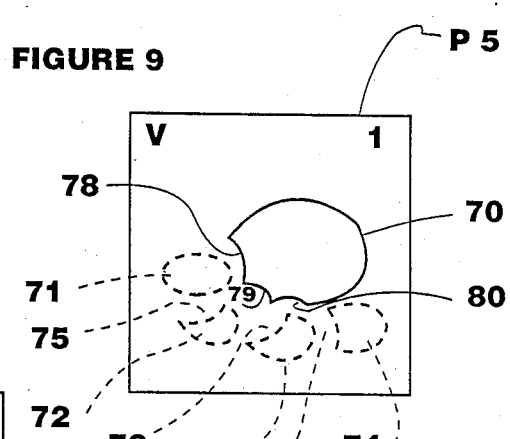
FIG. 10 is a schematic illustration of a photograph made with the five slide system shown in FIG. 9.

In FIGS. 9 and 10, five slides 20 of FIG. 9 produce five corresponding images 70-74 shown in FIG. 10. The image 70 includes three concave sections at its peripheries 78, 79, 80. The image 70 is produced by aperture 90 and the recessed sections of the photographic image 70 designated as 78, 79, and 80 are respectively produced by the corresponding concave sections 91, 92, 93 of the aperture 90. Similarly, the image 71 is created by aperture 85, the image 72 by aperture 86, the image 73 by aperture 88, and the image 74 is produced by aperture 98 having concave peripheral section 99.

Each of the slides 20 is preferably of an equal lateral dimension so that each will fit within the border 16, 17 of camera body 12. In making a photograph, the darkened slides are sequentially positioned within the camera body frame 16, 17 as shown in FIG. 1. Each slide 20 thus occupies the same position within the frame 16, 17 with respect to the lens when the film is exposed. If the slides 20 in a given group are sequentially positioned within the camera body frame 15, a photograph will be made which contains multiple exposures and in fact an exposure for each slide and particularly an image which has a shape corresponding to the shape of the aperture on that particular slide. Each group of slides 20 is formed by placing the apertures with respect to the peripheral edges of the slide in such a fashion that none of the images overlap and in fact so that the images are closely nested as shown in the photographs P, P2, P3, P4, and P5. If the slides 20 of FIG. 3 were superimposed, the position of apertures 31, 32 would be the same as the positions of images 22, 23 in FIG. 4. This same corresponding relationship is seen in FIGS. 5 and 6 where the images in photograph 3 of FIG. 6 show the relative positions of images 36, 37, 38 as well as the relative position of apertures 42, 43 and 44 with respect to the peripheral edges of slides 20. Similarly, in FIGS. 7-8, the photograph P4 reflects the relative position of apertures 60, 61, 64, 65 of slides 20 shown in FIG. 7. In like manner, the photograph P5 of FIG. 10 shows the relative position of apertures 85, 86, 90, and 98 as corresponding to the positions of images 70-74 of P5 in FIG. 10.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limited sense.

What is claimed as invention is:

1. A multi-card masking apparatus for forming multiple exposure photographic images upon film contained in a camera when a photographer sequentially uses the cards, comprising:
  a. a plurality of at least first and second darkened slide cards of corresponding size and shape so that a plurality of the cards can be repeatedly manually registered in a precise, preselected "shooting" position with respect to each other by the photographer;
  b. a binding that connects the slide cards together along one edge portion of each card;
  c. a generally circular first aperture formed in the first of the slide cards;
  d. an aperture formed in the second of the slide cards and including a partially circular periphery and a partially concave periphery that nests closely with the first aperture when the cards are superimposed; and
  e. registering means for sequentially mounting each card upon the camera in a position that places the apertures in different positions with respect to the film so that multiple exposure photographic images made with the camera have multiple images that occupy different spacial positions ,and wherein the binding is normally positioned by the photographer in an identical "shooting" position with respect to the registering means during use so that the slide cards are accurately positioned when the photographer positions the binding in the shooting position.

2. The apparatus of claim 1 wherein the registering means includes a frame carried by the camera.

3. The apparatus of claim 1 wherein the cards are of substantially identical dimensions.

4. The apparatus of claim 1 wherein there are three cards, each having a single aperture.

5. The apparatus of claim 1 wherein there are four cards, each having a single aperture.

6. The apparatus of claim 1 wherein there are five cards, each having a single aperture.

7. The apparatus of claim 4 wherein two of the apertures has concave peripheral portions.

8. The apparatus of claim 5 wherein three of the apertures have concave peripheral portions.

9. The apparatus of claim 6 wherein four of the apertures have concave peripheral portions.

* * * * *